United States Patent
Ylä-Outinen et al.

(10) Patent No.: US 7,085,565 B1
(45) Date of Patent: Aug. 1, 2006

(54) METHOD AND APPARATUS FOR CONTROLLING A SUBSCRIBER'S LOCAL OPERATION IN A MOBILE COMMUNICATION SYSTEM

(75) Inventors: Petteri Ylä-Outinen, Ojakkala (FI); Sari Komulainen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/567,186

(22) Filed: May 9, 2000

Related U.S. Application Data

(63) Continuation of application No. PCT/FI98/00877, filed on Nov. 11, 1998.

(30) Foreign Application Priority Data

Nov. 14, 1997 (FI) .................................. 974245

(51) Int. Cl.
*H04Q 7/20* (2006.01)

(52) U.S. Cl. ............... 455/432.3; 455/406; 455/411; 455/414.1; 455/456.3

(58) Field of Classification Search ........... 455/411, 455/432.1, 432.3, 433, 422.1, 435.1, 435.2, 455/435.3, 256.1, 456.3, 456.5, 445, 400, 455/407, 408, 414.1, 414.2
See application file for complete search history.

(56) References Cited

U.S. PATENT DOCUMENTS

| | | | |
|---|---|---|---|
| 5,740,542 A | | 4/1998 | Leeper et al. |
| 5,950,125 A | * | 9/1999 | Buhrmann et al. .......... 455/422 |
| 6,038,445 A | * | 3/2000 | Alperovich et al. ...... 455/432.1 |
| 6,405,040 B1 | * | 6/2002 | Liu et al. ..................... 455/435 |

FOREIGN PATENT DOCUMENTS

| | | |
|---|---|---|
| EP | 0 597 638 | 5/1994 |
| EP | 0 641 137 | 3/1995 |
| WO | WO 96/39000 | 12/1996 |
| WO | WO 97/13387 | 4/1997 |
| WO | WO 97/30559 | * 8/1997 |

OTHER PUBLICATIONS

Mouly, et al., "The GSM System for Mobile Communications", ISBN: 2-9507190-0-7, 1992.

* cited by examiner

*Primary Examiner*—Quochien B. Vuong
*Assistant Examiner*—Philip J. Sobutka
(74) *Attorney, Agent, or Firm*—Squire, Sanders & Dempsey LLP

(57) ABSTRACT

A method and apparatus for implementing local subscriber- and subscriber-group specific services are provided. According to one embodiment, the method includes the steps of defining a mobile subscriber's local parameters of a cell and providing the mobile subscriber's local parameters and local parameters of the cell to the unit controlling local operation of a mobile station. The method also includes the steps of comparing the mobile subscriber's local parameters with the local parameters of the cell and controlling the mobile subscriber's local operation on the basis of compatibility of the local parameters.

18 Claims, 5 Drawing Sheets

METHOD AND APPARATUS FOR CONTROLLING A SUBSCRIBER'S LOCAL OPERATION IN A MOBILE COMMUNICATION SYSTEM

This is a request for filing a continuation application under 37 C.F.R. §1.53(b) of prior pending international application number PCT/FI98/00877 filed on 11 Nov. 1998.

BACKGROUND OF THE INVENTION

The invention relates to mobile communication systems and particularly to a method for controlling a mobile subscriber's local operation in a mobile communication system, in which a mobile station is arranged to roam within a cellular network and to connect to a local cell.

One of the objectives in mobile communication systems has recently been to develop mobile station services to be more and more equal to the conventional services of the fixed network so that they could replace fixed-line services both in offices and at home. In other words, a subscriber or a company is provided with a service area to which specific cells are selected (known e.g. as special cells) where a local subscriber-specific service profile, for example, is defined. That is to say, services and tariffs dependent on the location of the subscriber are produced for the subscriber. Such a cluster of cells is referred to as a Localized Service Area LSA or an LGS area. The subscriber can be an ordinary home user, for example, whose LSA is part of the radio access network covering his home and its immediate surroundings. Within this LSA special tariffs can be offered only to the home subscriber. The subscriber can also be a company employee to whom the localized service area LSA forms a company-wide network that utilizes the radio access solutions in the premises, for example. In the LSA, special tariffs can be offered only for company employees. The LSA typically comprises a cell or a cluster of cells. The cells in the cluster of cells can also be dispersed.

One prior art alternative of implementing subscriber-and subscriber-group-specific localized service areas is a method in which mobile-station-specific lists of special cells are drawn up of one or more network cells, and the operation of a mobile station is controlled on the basis of said list of special cells. Such controlling may comprise e.g. connection primarily to cells which provide some special service, e.g. call charges below the standard tariff.

Another prior art solution to implementing localized service areas in a radio network is a method in which a mobile station measures the signal levels of a serving cell and neighbouring cells. A cell selection parameter is calculated for the measured cells on the basis of the measured signal levels, and the cell which is the best according to the cell selection parameters is selected as the serving cell. In the method, calculation of a cell selection parameter of certain cells is processed so that the probability of a special cell becoming selected increases in proportion to a standard cell.

The above solutions are substantially based on a list of special cells, which is included in the system and utilized in controlling the local operation of a mobile station. Definition based on cell-specific information, however, increases the amount of information to be stored, makes definition of configuration slower and increases the amount of work when changes are made to the network. By using the list of special cells all special services of a special cell can be defined as available to a subscriber, but within a cell it is not possible to provide subscriber-specific tailored special services.

BRIEF DESCRIPTION OF THE INVENTION

An object of the invention is to provide an improved method and apparatus for implementing local subscriber- and subscriber-group-specific services.

The objects of the invention are achieved with a method according to claim 1 for controlling a mobile subscriber's local operation in a mobile communication system, in which a mobile station is arranged to roam within a cellular network and to connect to a local cell. The method is characterized in that it comprises defining a mobile subscriber's local parameters, defining local parameters of a cell, providing said mobile subscriber's local parameters and local parameters of the cell to the unit controlling the operation of the mobile station, comparing the mobile subscriber's local parameters with the local parameters of the cell and controlling the mobile subscriber's local operation on the basis of compatibility of said local parameters.

The invention also relates to a mobile communication system which controls a mobile subscriber's local operation and in which a mobile station is arranged to roam within a cellular network and to connect to a local cell. The system is characterized in that it comprises a subscriber data base for storing the mobile subscriber's local parameters, a database for storing local parameters of the cell, means for providing said mobile subscriber's local parameters and local parameters of the cell to the unit controlling the local operation of the mobile station, means for comparing the mobile subscriber's local parameters with the local parameters of the cell, and means for controlling the mobile subscriber's local operation on the basis of compatibility of said local parameters.

The invention further relates to a subscriber data base as claimed in claim 11 in a mobile communication system, which controls a mobile subscriber's local operation and in which a mobile station is arranged to roam within a cellular network and to connect to a local cell. The subscriber data base is characterized in that it is arranged to store the mobile subscriber's local parameters and to transfer said mobile subscriber's local parameters to the unit controlling the local operation of the mobile station or to the subscriber data base in connection with the unit.

Furthermore, the invention relates to a unit as claimed in claim 13 controlling a mobile subscriber's local operation in a mobile communication system, in which a mobile station is arranged to roam within a cellular network and to connect to a selected local cell. Said unit is characterized in that it comprises means for receiving said subscriber's local parameters and local parameters of the cell, means for comparing the mobile subscriber's local parameters with the local parameters of the cell, and means for controlling the mobile subscriber's local operation on the basis of compatibility of said local parameters.

The dependent claims relate to preferred embodiments of the invention. The invention is based on the idea that one or more parameters defining the local operation of a cell are defined for cells and mobile subscribers. In connection with events related to the operation of a mobile station, e.g. in connection with call set-up, compatibility of the parameters of the mobile subscriber and the cell is checked, and operation is controlled according to selected decision-making based on compatibility of the parameters.

An advantage of the method and system of the invention is that they allow to make several, even multilevel definitions easily by means of parameters, which can be managed without difficulty also when changes are made to the system. Due to definitions made in the form of parameters the amount of definition data that needs to be transmitted remains substantially the same, even though the system and the definitions become more complicated.

BRIEF DESCRIPTION OF THE DRAWINGS

In the following, the invention will be described in greater detail in connection with preferred embodiments with reference to the accompanying drawings, in which

The present invention can be applied to any cellular mobile communication system. In the following, the invention will be described in greater detail by way of example mainly with reference to the pan-European digital GSM system. FIG. 1 illustrates a simplified structure of the GSM network described above. With respect to a more detailed description of the GSM system, reference is made to GSM recommendations and *The GSM System for Mobile Communications*, M. Mouly & M. Pautet, Palaiseau, France, 1992, ISBN: 2-9507190-0-7.

In order to illustrate the background of the invention FIG. 1 shows a simplified flow chart of the pan-European GSM system. The mobile station MS is connected via a radio path to a base transceiver station BTS; in the case shown in FIG. 1 to the base transceiver station BTS1. An idle mobile station MS receives transmission from the base transceiver station selected by it. A base station subsystem BSS comprises a base station controller BSC and base transceiver stations BTS under its control. Usually, there are several base station controllers BSC under a mobile services switching centre MSC. The mobile services switching centre MSC is connected to other mobile services switching centres, a gateway mobile services switching centre (GMSC) and possibly to an intelligent network IN. The GSM network is connected to other networks via the gateway mobile services switching centre GMSC, such as the public switched telephone network PSTN, another mobile communication network PLMN, ISDN network or intelligent network IN.

Figure 1:
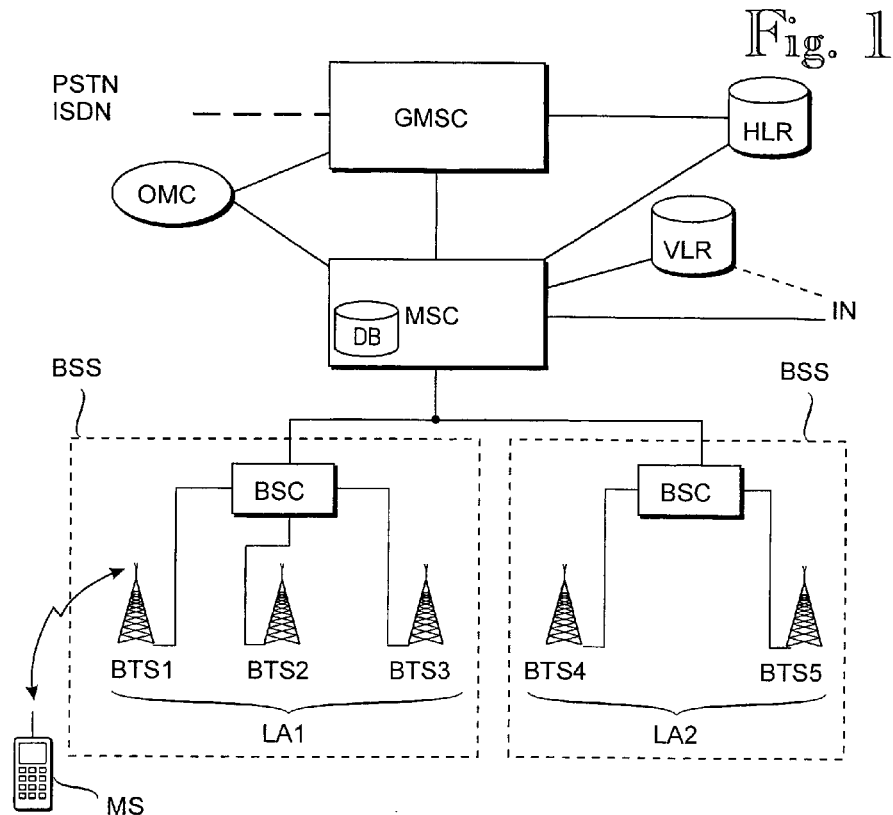
FIG. 1 illustrates a simplified structure of the GSM system.

The mobile subscriber data MS are stored permanently in the home location register HLR of the system, and temporarily in the visitor location register VLR in the area of which the mobile station is located at a given time. The location data of the mobile station MS is stored in the visitor location register VLR with an accuracy of a location area LA. The geographical area controlled by the visitor location register is divided into one or more location areas LA, within each of which the MS may roam freely without notifying the VLR. Within each location area there may be one or more base transceiver stations BTS in operation.

Base transceiver stations BTS continuously broadcast information on themselves and their environment on their broadcast control channel, e.g. the cell identity CI, information on neighbouring cells and the location area identifier LAI. On the basis of the LAI, the mobile station MS receiving broadcast transmission from the base transceiver station BTS knows in which location area LA it is at a given time. If the mobile station MS notices, on changing the base transceiver station BTS, that the location area identifier LAI of the base transceiver station has changed, it sends a request for location updating to the network. The location area of the mobile station MS is updated to the visitor location register VLR in the area of which the mobile station is at a given time. Information on the VLR covering the area where the MS is located is transmitted to the home location register HLR.

The mobile station MS continuously measures signals of the base transceiver stations BTS located nearest to the cell within which the mobile station is located e.g. to determine the base transceiver station providing the best signal and to be prepared for a possible handover. The mobile station identifies the neighbouring cells it is to monitor on the basis of the information on neighbouring cells transmitted by each base transceiver station on its broadcast control channel. For example, in the GSM system the mobile station MS can simultaneously measure the signalling level and/or quality of a maximum of 32 other base transceiver stations in addition to the serving base transceiver station. When roaming within the mobile communication network, the mobile station MS usually connects to receive the base transceiver station BTS having the strongest signal. Thus an effort is made to set up a call terminating to a mobile station MS or a call originating therefrom primarily through this base transceiver station BTS.

In the future it should be possible to define a localized service area of certain (one or more) network cells, called special cells, for a mobile subscriber. In the present application a special cell refers to a cell of standard network planning, in which a some special service can be offered to a subscriber. The special cell may be e.g. a macrocell, microcell or picocell. The operator selects those network cells that will be defined as a certain mobile subscriber's special cells, and will hence be included in the localized service area LSA to be formed for the subscriber.

The localized service area LSA can be defined in compliance with the subscriber's needs to be of an arbitrary size and shape. It can be a very small service area, such as a "home area" covering one or more cells, a very large area covering a part of a city (one or more location areas), or a combination of them. It should also be noted that the logical location areas defined in the network and the subscriber-specific local service areas are independent of one another. The localized service areas LSA of different subscribers and subscriber groups can be superimposed or overlapping, that is, one cell may be part of several localized service areas.

Figure 2:
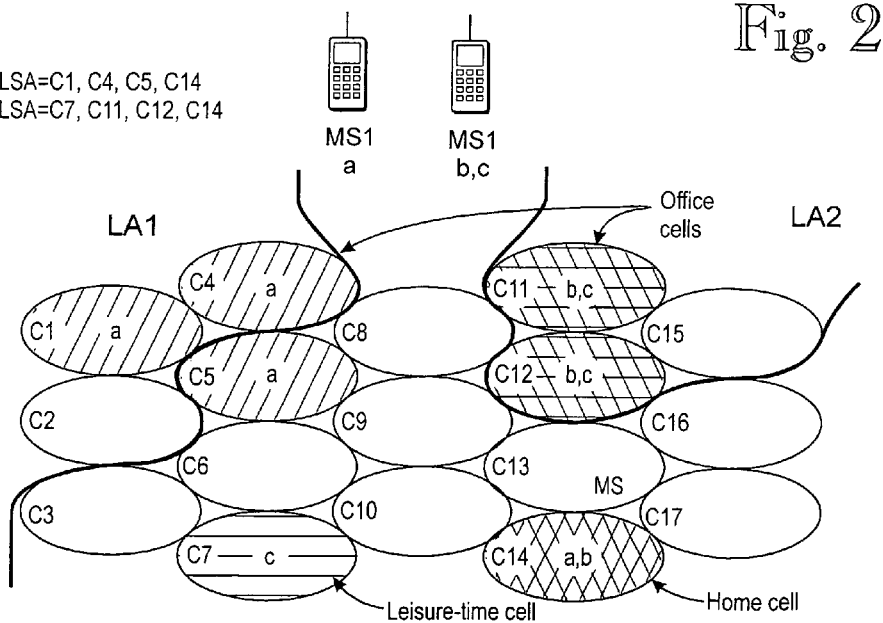
FIG. 2 illustrates local area concept.

The local area concept is illustrated in FIG. 2. The figure shows cells C1 to C17, of which e.g. C1, C2 and C4 belong to location area LA1 and cells C11, C12 and C15 to location area LA2. FIG. 2 also shows the mobile subscriber's MS1 localized service area LSA1, the area comprising home cells C14 and office cells C1, C4 and C5, and the mobile subscriber's MS2 localized service area LSA2, the area comprising leisure-time cell C7, home cell C14 and office cells C11 and C12. Like the other cells, cells C1, C4, C5, C7, C11, C12 and C14 are ordinary cells of the GSM network which are available to all subscribers of the cellular network. For the subscribers in question they are, however, special cells because in these cells they can take advantage of call charges below the standard tariff, for example. Instead of being general network cells, office cells C1, C4, C5, C11 and C12 can be private office cells to which only company employees have access. Other users visiting the company premises will use the public cells covering the location area of the office.

In the present invention, in order to define localized service areas, one or more parameters, called local parameters in the following, are defined to the mobile subscriber data. In FIG. 2 local parameters are illustrated with letters a, b and c, but the parameters can be defined specifically for each application as any numbers, letters or other characters or strings of characters. The subscriber's local parameters are preferably stored in his home location register HLR, from which they are first transmitted to the visitor location register VLR in connection with location updating and then to the switching centre MSC. There are, however, several ways of storing the parameters in the system and providing them to the unit controlling local operation, and the way of implementation is not relevant to the invention as such. The local parameter can be stored e.g. in the SIM card of the mobile station, from which they are transmitted to the visited network as a USSD function in connection with location updating. Storage and transmission of information can also be realized as a service of the intelligent network IN. As regards the present invention, it is essential that the mobile communication system comprises a data base for storing the mobile subscriber's local parameters controlling local operation, and that local parameters are transferred from said data base to the unit controlling the subscriber's local operation at a given time.

In the invented solution, local parameters needed for controlling the subscriber's local operation are defined for each cell, i.e. in the example shown in FIG. 2 parameters a, b and c. One or more parameters can be defined both for the mobile subscriber and the cell. The local operation of the mobile station can be controlled in a desired way by comparing the parameters of the cell and mobile subscriber to find out whether they are compatible. By means of parameters it is possible to influence e.g. switching of outgoing or incoming calls, their tariffs or duration in the cell in question. In some cases it is also possible to control connection of a mobile station to a cell in connection with location updating, etc. Due to the parameter structure the invention provides a flexible solution for tailoring highly individual service profiles.

Figure 3:
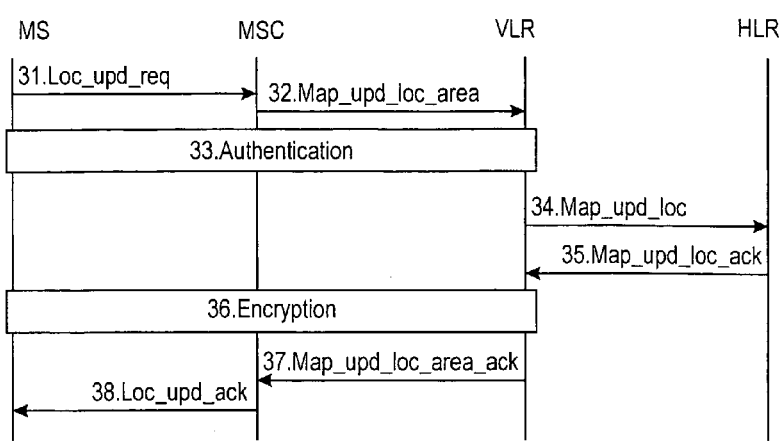
FIG. 3 is a signalling chart illustrating by way of example location updating triggered by a mobile station MS.

In the following, a preferred embodiment of the invention will be viewed in greater detail. In this embodiment, the mobile subscriber's MS local parameters are stored in the home location register HLR. In mobile communication systems location information on a mobile station MS is needed for routing incoming calls and for other network services. FIG. 3 of the attached drawings shows by way of example location updating triggered by the mobile station MS as a signalling chart.

The mobile station MS requests a signalling channel from the base transceiver station BTS for location updating and sends a request for location updating (message 31) on the assigned channel. The request is transmitted to the mobile services switching centre MSC. The mobile services switching centre MSC forwards the request for location updating to the visitor location register VLR in message 32. In step 33, the authenticity of the subscriber is verified (known as authentication) e.g. to control the access to the network and to prevent abuse. In authentication, information stored in the network is compared with information stored in the mobile station MS.

After a successful authentication the new visitor location register VLR transmits a message 34 on location updating to the home location register HLR of the mobile station. The home location register HLR acknowledges location updating by sending the necessary mobile subscriber data (message 35) to the visitor location register VLR. In step 36, information on the protection algorithm that will be used is transmitted to the mobile station MS. The visitor location register VLR informs of completion of location updating in message 37. The mobile services switching centre MSC forwards this message to the mobile station MS in message 38. In the preferred embodiment of the invention the mobile subscriber's local parameters are stored in the home location register HLR, from which they are transferred to the visitor location register VLR as manufacturer-specific extra information to be included in message 35.

Figure 4:
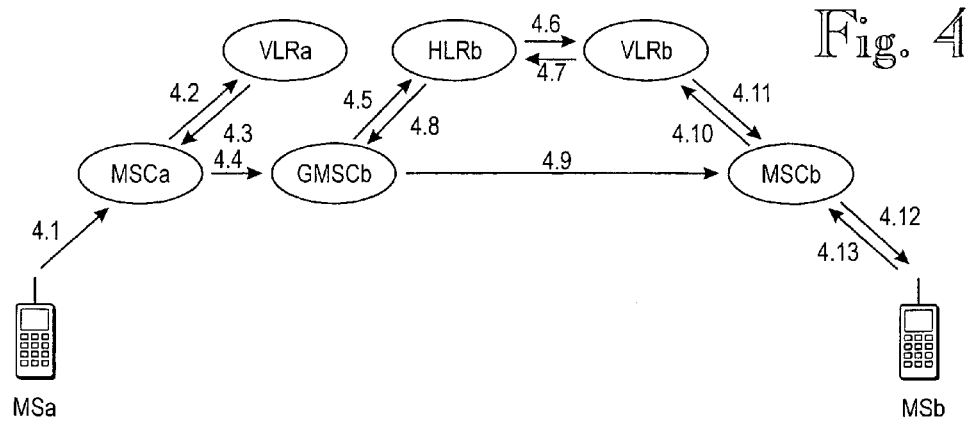
FIG. 4 is a block and signalling diagram illustrating call set-up between two mobile stations in a mobile communication system of the GSM type.

To illustrate the principles of the invention in connection with outgoing and incoming calls, call set-up between two mobile stations in a mobile communication system of the GSM type will be described with reference to the block and signalling diagram in FIG. 4. In step 4.1 the mobile station MSa sends a request for call set-up to the switching centre MSCa under the control of which subscriber A is at the moment of transmission. The switching centre MSCa sends a subscriber data interrogation to the visitor location register VLRa which is in connection with the switching centre (step 4.2), and the VLRa answers to it by sending data necessary for continuing call set-up to the switching centre MSCa (step 4.3).

The centre MSCa initiates call set-up signalling to the subscriber B's network (step 4.4). In the case of FIG. 4, the call enters the first switching centre GMSCb of the subscriber B's network, and the switching centre sends a routing information interrogation to the home location register HLRb determined by the subscriber's directory number MSISDN (step 4.5). In location updating, information on the visitor location register VLRb in the area of which subscriber B is is updated in the home location register HLR. On the basis of this information the home location register HLRb sends a request for reserving a roaming number for the visitor location register VLRb (step 4.6). The visitor location register VLRb reserves a roaming number for the subscriber and sends it in a reply message to the home location register HLRb (step 4.7), which transmits the roaming number to the switching centre GMSCb that requested routing information (step 4.8).

The roaming number space has been defined so that a call is always routed to the switching centre MSCb the visitor location register VLRb of which has reserved a roaming number. Hence the gateway switching centre GMSCb can route the call forward on the basis of the roaming number by sending an initial address message 4.9 to the mobile services switching centre MSCb indicated by the roaming number. Having received the initial address message 4.9 the switching centre MSCb finds out in the roaming number analysis that the call terminates to its own area and is not intended to be routed forwards. In that case the MSCb requests data of the called subscriber for call set-up from its own visitor location register VLRb, message 4.10. The visitor location register VLR sends the necessary data in a reply message 4.11, and if the MSC is capable of providing the necessary resources for data transmission, call set-up signalling is carried out between the switching centre MSCb and the mobile station MSb, which is illustrated with arrows 4.12 and 4.13.

In the following, a mobile-originating call in the mobile subscriber's localized service area will be viewed on the basis of the above. In FIG. 2, parameter a has been defined for the mobile subscriber MS1, whereby the subscriber's corresponding localized service area consists of those cells for which the same local parameter has been defined, i.e. according to the figure LSA1=C1, C4, C5, C14. In order to initiate call set-up the mobile station MS1 sends a request for call set-up to the switching centre MSC. Having received the request the switching centre MSC sends a subscriber data interrogation to the visitor location register VLR to which the subscriber is connected at the moment. According to the invention, the visitor location register is arranged to send the subscriber's MS1 local parameters transferred to the visitor location register VLR in connection with location updating back to the switching centre in the reply to the subscriber data interrogation.

In order to implement controlling according to the invention, a data base DB is included in the switching centre MSC. The records of the data base include cell identities of the base transceiver stations under the control of the switching centre and local parameters related to them. Having received information on the local parameters of the cell in the call set-up message and information on the local parameters of the mobile subscriber in the subscriber data interrogation, the switching centre MSC compares the parameters, and controls call set-up in a desired way according to compatibility of local parameters. For example, in the case of FIG. 2, the switching centre MSC can be defined to bar the subscriber's MS1 outgoing calls in cells other than those for which parameter a has been defined. On the other hand, the switching centre MSC can be defined to provide considerably cheaper call charges for the subscriber MS1 in a cell indicated by parameter a, i.e. in the localized service area consisting of those cells in which parameter a has been defined as a local parameter of the mobile station.

FIG. 2 shows an incoming call in the case of subscriber MS2. The principle is substantially the same, i.e. in the invented solution the switching centre MSC controls call set-up on the basis of compatibility of the parameters of the cell and mobile subscriber. Local parameters a, b and c controlling call set-up have been defined for the subscriber MS2, and thus his localized service area is LSA2=C1, C4, C5, C7, C11, C12, C14. In connection with an incoming call, the switching centre MSC requests called subscriber data for call set-up from the visitor location register VLR that has reserved a roaming number. The subscriber's MS2 local parameters a, b and c, which have been transferred to the visitor location register VLR during location updating, are transferred from the visitor location register VLR to the switching centre MSC in a reply to the subscriber data interrogation. After this, paging of a subscriber is initiated, as a result of which the switching centre MSC receives information on the subscriber's location in the form of cell identity with an accuracy of a cell. On the basis of the cell identity the switching centre MSC retrieves local parameters of the cell according to the invention from the data base DB, compares the local parameters of the cell and mobile subscriber and controls the local operation of the mobile station according to compatibility of the parameters. The subscriber MS2 can be barred from receiving calls outside the localized service areas, i.e. in cells the parameter set of which does not include parameter a, b or c. By means of parameters it is also possible to implement time restrictions, e.g. the normal use of a mobile station can be allowed in all cells during office hours, and at other times the use of the mobile station can be barred in cells other than those defined as special service areas with parameters a, b and c.

On the basis of the above it can be noted that the parameter-based definition provides innumerable possibilities for controlling local operation of a mobile station. Function of the unit controlling local operation of a mobile station, i.e. the switching centre MSC in the embodiment described above, on the basis of comparison of parameters can be implemented specifically for each application in the best possible way.

Figure 5:
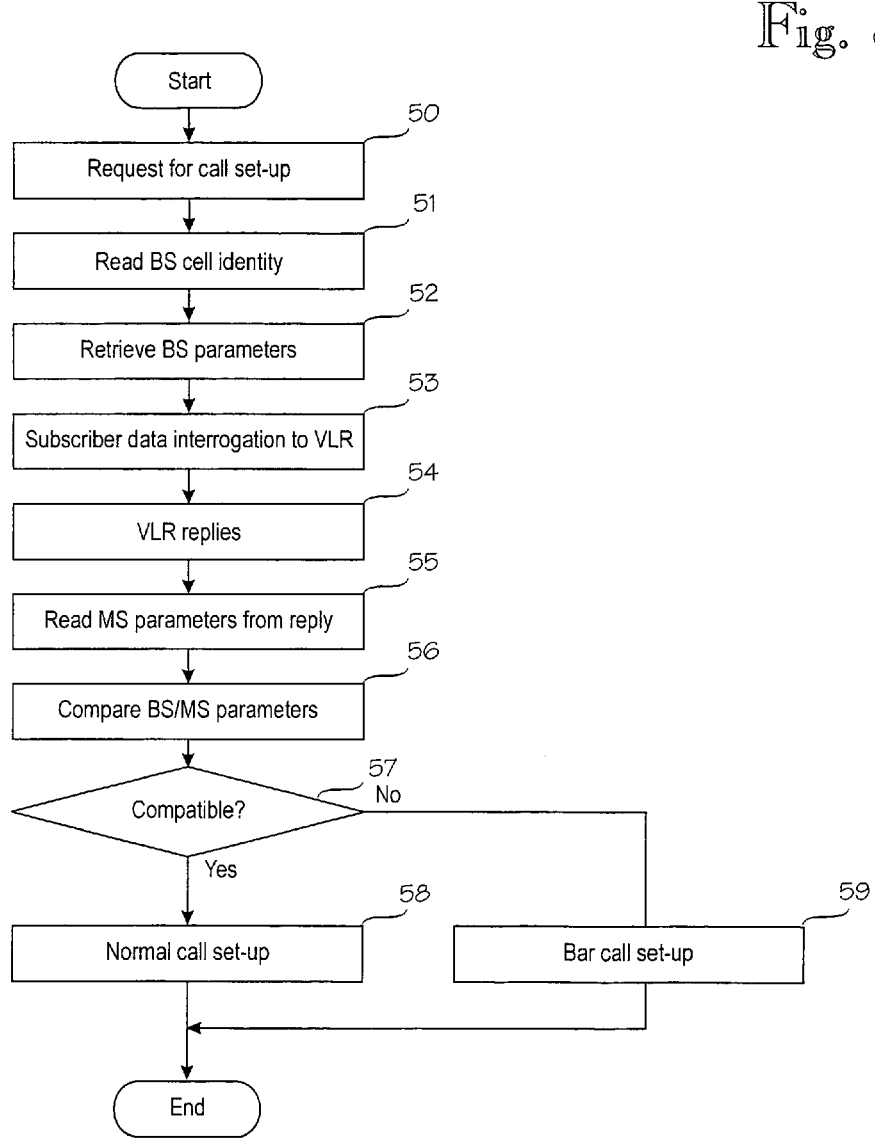
FIG. 5 is a flow chart illustrating a first embodiment of the invention in the case of a mobile-originating call.

The flow chart of FIG. 5 illustrates a first embodiment of the invented solution in the case of a mobile-originating call, viewed in terms of functionality of the unit controlling local operation of a mobile station, i.e. the switching centre MSC in this example. In step 50, the switching centre receives the request for call set-up coming from the mobile station. The switching centre reads the cell identity from the request (step 51) and retrieves local parameters of a cell which correspond to the cell identity from the data base DB. As usual, the switching centre sends a subscriber data interrogation related to the mobile subscriber to the visitor location register (step 53). The visitor location register sends the subscriber's local parameters back to the switching centre in a reply to the subscriber data interrogation (step 54), and the switching centre reads these parameters from the reply (step 55). After having found out local parameters of the cell and subscriber, the switching centre compares the parameters (step 56). On the basis of compatibility of the parameters (step 57) the switching centre concludes whether call set-up can be continued normally (step 58) or whether it has to be barred (step 59).

Figure 6:
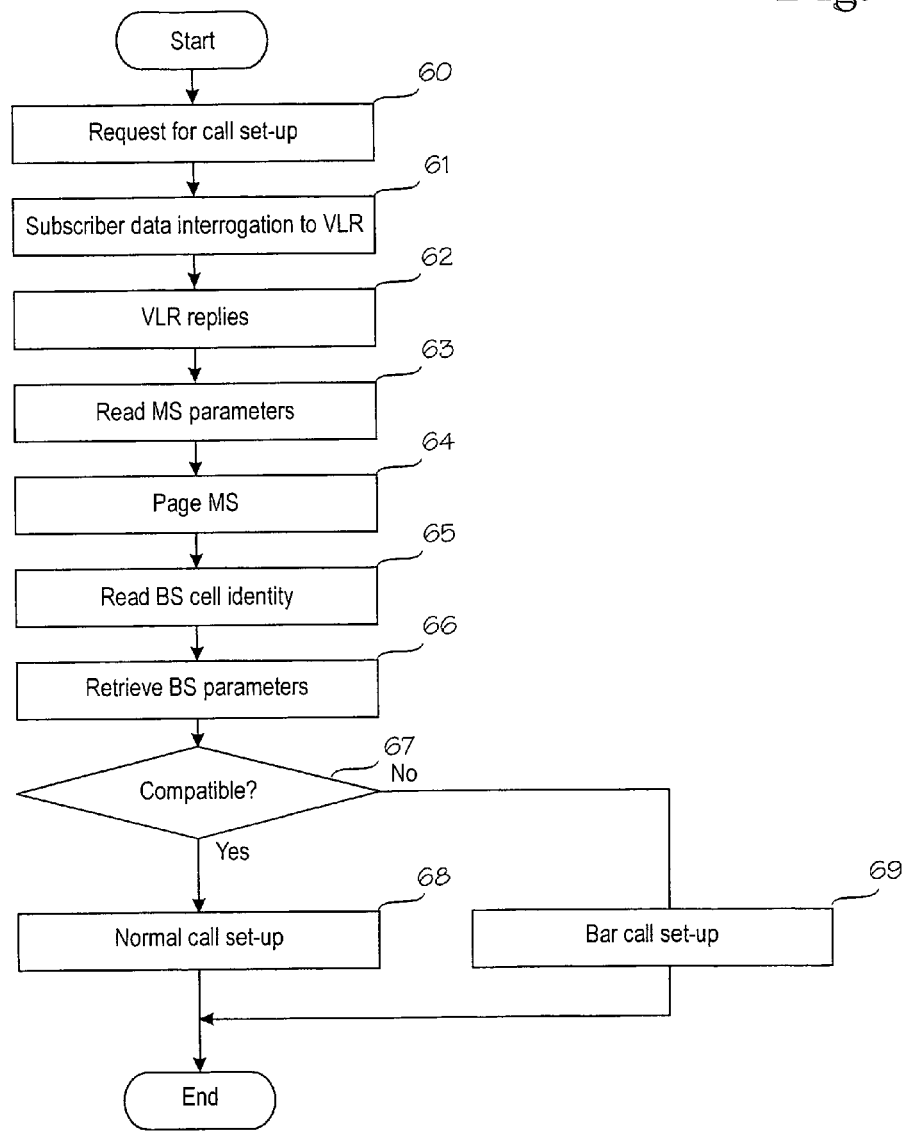
FIG. 6 is a flow chart illustrating a first embodiment of the invention in the case of a mobile-terminating call.

The flow chart of FIG. 6 correspondingly illustrates a first embodiment of the invented solution in the case of a mobile-terminating call. In step 60, the switching centre receives an incoming request for call set-up, and as a consequence, sends a subscriber data interrogation relating to the mobile subscriber to the visitor location register (step 61). The visitor location register sends the subscriber's local parameters in a reply to the subscriber data interrogation (step 62), and the switching centre reads them from the reply (step 63). After this call set-up continues normally by initiating paging of the mobile station (step 64). If paging succeeds, the switching centre receives information on the cell identity of the cell to which the mobile station is connected. On the basis of the cell identity (step 65) the switching centre retrieves the local parameters of the cell from the data base DB (step 66) and compares them with the subscriber's local parameters received earlier (step 67). If the parameters are compatible, the switching centre continues call set-up normally (step 68). If the parameters are incompatible, the switching centre discontinues call set-up (step 69).

Figure 7:
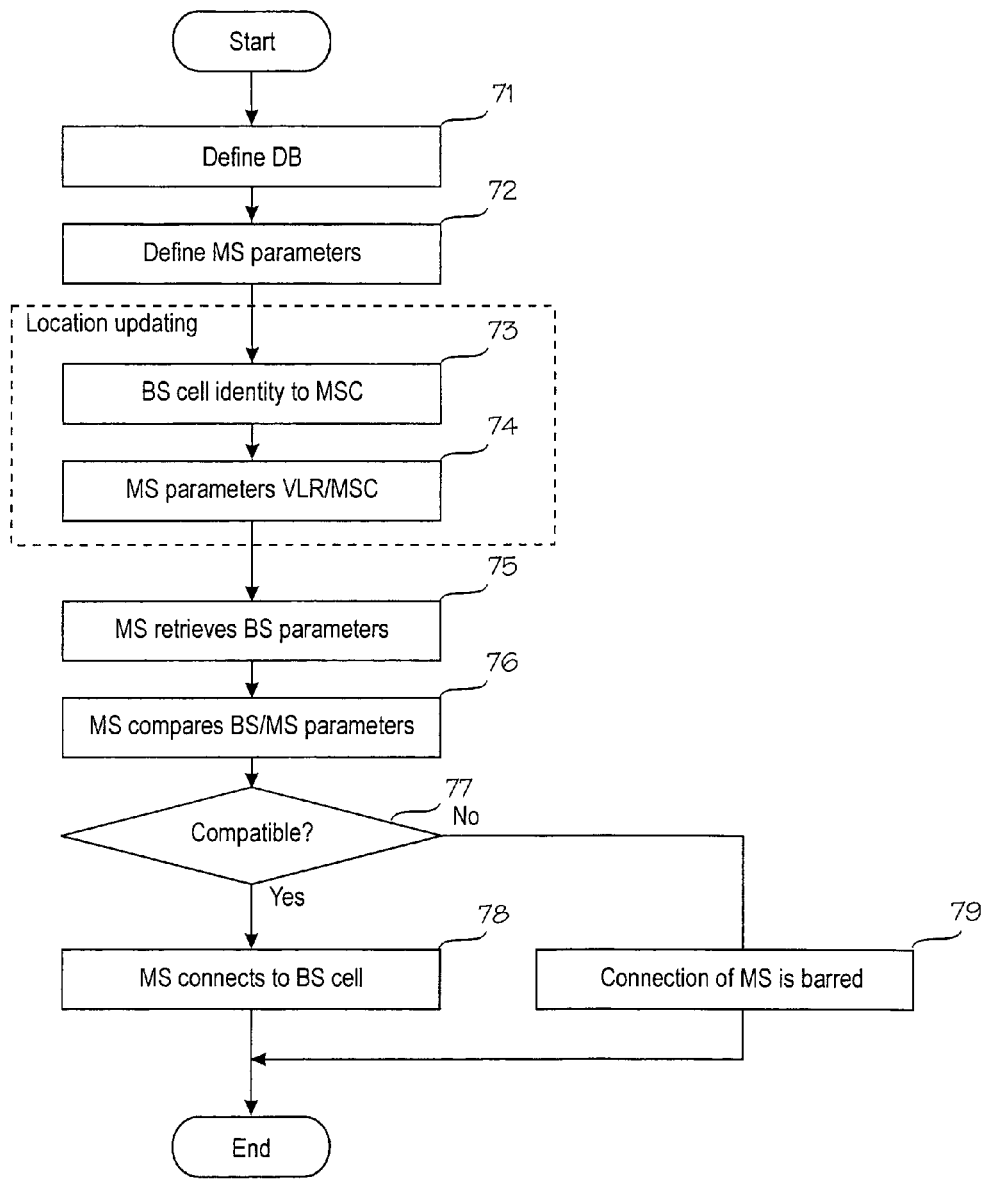
FIG. 7 is a flow chart illustrating the invented solution at the system level in such a case in which the system is arranged to transmit a subscriber's location in connection with location updating with an accuracy of a cell identity.

At the moment, the subscriber's location is not always transmitted in the GSM system in connection with location updating with an accuracy of a cell identity but with an accuracy of a location area identifier. The flow chart of FIG. 7 illustrates the invented solution at the system level in such a case in which the system is arranged to transfer the subscriber's location in connection with location updating with an accuracy of a cell identity. In that case, it is also possible to control the mobile subscriber's MS connection to a cell by means of local parameters. Local parameters of the cell, which are stored in the data base DB of the switching centre MSC, are defined in step 71. The subscriber's MS local parameters, which are preferably stored in the subscriber's home location register HLR, are defined in step 72. In connection with location updating the cell identity of the base station BS is transferred to the switching centre MSC (step 73), and the mobile subscriber's local parameters are transmitted in the message on location updating sent from the home location register HLR to the visitor location register VLR (step 74). The switching centre MSC retrieves local parameters of the cell from the data base DB on the basis of the cell identity (step 75) and compares them with the subscriber's local parameters (step 76). On the basis of the information on compatibility achieved as a result of the comparison (step 77) the switching centre MSC either continues location updating normally (step 78) or bars the mobile station MS from connecting to the cell in question (step 79).

The ways of using parameters described above were simplified, but the invention also allows more individual solutions to be implemented as regards the local operation of a mobile station. For example, it is possible to define a specific operation for each parameter. In that case, the unit MSC controlling local operation can be arranged e.g. to bar calls in such cases in which parameters controlling outgoing calls of the cell and subscriber are not compatible, or to bar the subscriber from receiving calls in cells in which parameters controlling mobile-terminating calls are not compatible. For example, if in the case of FIG. 2 the local parameter b is defined to control incoming calls and the local parameter b to control outgoing calls, the mobile subscriber MS2 can make calls from cells C7, C11 and C12 and receive calls in cells C11, C12 and C14. In that case, parameters b and c indirectly function as an incoming access code and outgoing access code. Such a solution provides an option of controlling set-up of outgoing and incoming calls separately, which is a significant additional advantage of the invention.

Check of the parameters controlling local operation can also initiate some other subscriber facility. For example, if the above-mentioned incoming and outgoing access codes are implemented otherwise than in the parameter form described, e.g. as CUG codes, compatibility (or optionally incompatibility) of the local parameters of the cell and mobile subscriber can trigger checking of the subscriber's other access codes. The subscriber facility triggered on the basis of comparison can also be e.g. an intelligent network service.

In the above embodiment the unit controlling local operation was preferably the switching centre MSC to the visitor location register of which the mobile station was about to connect or had connected in connection with location updating. An advantage of this solution is that implementation of the described embodiment causes very few changes to the existing systems. It will be obvious to one skilled in the art that the comparison of parameters can also be carried out in some other unit of the mobile communication system, provided that information relevant to the invention can be arranged into the unit concerned.

It is obvious to one skilled in the art that as the technology develops, the inventive concept can be implemented in many different ways. Hence the invention and its embodiments are not limited to the above examples, but vary within the scope of the appended claims.

The invention claimed is:

1. A method for controlling a mobile subscriber's local operation in a mobile communication system, in which a mobile station is arranged to roam within a cellular network and to connect to a cell, the method comprises the steps of:
 defining a set of local parameters for the mobile subscriber;
 using the set of local parameters to define a localized service area related to special services that are available to the mobile subscriber;
 defining local parameters of the cell wherein the local parameters of the cell are used to define services that are available in the cell;
 providing the set of local parameters for the mobile subscriber and the local parameters of the cell to a unit controlling operation of the mobile station, the control unit receiving the same set of local parameters of the mobile subscriber regardless of a current location of the mobile station;
 comparing the set of local parameters for the mobile subscriber with the local parameters of the cell; and
 allowing a set of local service for the mobile subscribe on the basis of compatibility of said local parameters; and
 disallowing another set of service for the mobile subscriber on the basis of compatibility of the local parameters,
 wherein the special services cover at least one of special tariff in the localized service area or special access rights.

2. A method as claimed in claim 1, wherein set-up of calls originating from or terminating to the subscriber's mobile station is barred in those cells in which the selected set of local parameters for the mobile subscriber is not compatible with the local parameter of the cell.

3. A method as claimed in claim 1, wherein the mobile station is barred from connecting to those cells in which the selected set of local parameters for the mobile subscriber and the local parameter of the cell are incompatible.

4. A method as claimed in claim 2, wherein the set of local parameters for the mobile subscriber and the local parameter of the cell are interpreted as compatible if the parameters are the same.

5. A method as claimed in claim 2, further comprising:
 checking in response to the fact that the set of local parameters for the mobile subscriber and the local parameter of the cell are incompatible whether there is any other mobile-subscriber-related access code allowing call set-up; and
 allowing call set-up in response to the fact that there is a mobile-subscriber-related access code allowing call set-up.

6. A mobile communication system controlling a mobile subscriber's local operation, in which a mobile station is arranged to roam within a cellular network and to connect to a local cell, the system comprising:
 a subscriber data base for storing a set of local parameters for the mobile subscriber wherein the set of local parameters for the mobile subscriber are used to define a localized service area related to special services—that are available to the mobile subscriber;
 a data base for storing local parameters of the cell wherein the local parameters of the cell are used to define services that are available in the cell;
 means for providing set of local parameters for the mobile subscriber and the local parameters of the cell to a unit controlling operation of the mobile station, the set of mobile subscriber's local parameters being the same set of local parameters of the mobile subscriber regardless of a current location of the mobile station;
 means for comparing the set of local parameters for the mobile subscriber with the local parameters of the cell;
 means for allowing a set of local services of the mobile subscriber on the basis of compatibility of said local parameters; and
 means for disallowing another set of services for the mobile subscriber on the basis of compatibility of the local parameters,
 wherein the special services cover at least one of special tariff in the localized service area or special access rights.

7. A system as claimed in claim 6, wherein said means are arranged to bar set-up of calls originating from or terminating to the subscriber's mobile station in those cells in which the selected set of local parameters for the mobile subscriber and the local parameter of the cell are incompatible.

8. A system as claimed in claim 6, wherein said means are arranged to bar the subscriber from connecting to those cells in which the selected set of local parameters for the mobile subscriber and the local parameter of the cell are incompatible.

9. A system as claimed in claim 7, wherein the set of local parameters for the mobile subscriber and the local parameter of the cell are interpreted as compatible if the parameters are the same.

10. A system as claimed in claim 7, wherein the unit controlling local operation of the mobile station is arranged to:
    check in response to the fact that the set of local parameters for the mobile subscriber and the local parameter of the cell are incompatible whether there is any other mobile-subscriber-related access code allowing call set-up; and
    allow call set-up in response to the fact that there is a mobile-subscriber-related access code allowing call set-up.

11. A subscriber data base in a mobile communication system controlling a mobile subscriber's local operation, in which a mobile station is arranged to roam within a cellular network and to connect to a selected local cell the subscriber data base is arranged to:
    store a set of local parameters for the mobile subscriber, wherein the set of local parameters for the mobile subscriber are used to define a localized service area related to special services that are available to the mobile subscriber; and
    transfer said set of local parameters for the mobile subscriber to a unit controlling operation of the mobile station or to a subscriber data base in connection with the unit, the set of mobile subscriber's local parameters being the same set of local parameters of the mobile subscriber regardless of a current location of the mobile station,
    wherein the special services cover at least one of special tariff in the localized service area or special access rights.

12. A subscriber data base as claimed in claim 11, wherein the subscriber data base is arranged to transfer said set of local parameters for the mobile subscriber to the subscriber data base in connection with the unit controlling operation of the mobile station in connection with location updating.

13. A unit controlling a mobile subscriber's local operation in a mobile communication system, in which a mobile station is arranged to roam within a cellular network and to connect to a selected local cell comprising:
    means for receiving a set of local parameters for the mobile subscriber and local parameters of the cell wherein the set of local parameters for the mobile subscriber are used to define a localized service area related to special services that are available to the mobile subscriber and the local parameters of the cell are used to define services that are available in the cell, the set of mobile subscriber's local parameters being the same set of local parameters of the mobile subscriber regardless of a current location of the mobile station;
    means for comparing the set of local parameters for the mobile subscriber with the local parameters of the cell;
    means for allowing a set of local services for the mobile subscriber on the basis of compatibility of said local parameters; and
    means for disallowing another set of services for the mobile subscriber on the basis of compatibility of said local parameters,
    wherein the special services cover at least one of special tariff in the localized service area or special access rights.

14. A unit as claimed in claim 13, wherein the unit is arranged to bar set-up of calls originating from or terminating to the subscriber's mobile station in those cells in which the set of local parameters for the mobile subscriber and the local parameter of the cell are incompatible.

15. A unit as claimed in claim 13, wherein the unit is arranged to bar the mobile station from connecting to those cells in which the selected set of local parameters for the mobile subscriber and the local parameter of the cell are incompatible.

16. A unit as claimed in claim 14, wherein the unit is arranged to interpret the selected set of local parameters for the mobile subscriber and the local parameter of the cell as compatible if the parameters are the same.

17. A unit as claimed in claim 14, wherein the unit is arranged to:
    check in response to the fact that the set of local parameters for the mobile subscriber and the local parameter of the cell are incompatible whether there is any other mobile-subscriber-related access code allowing call set-up; and
    allow call set-up in response to the fact that there is a mobile subscriber-related access code allowing call set-up.

18. A unit as claimed in claim 13, wherein the unit is the switching center of the mobile communication system.

* * * * *